(12) United States Patent
Stanley et al.

(10) Patent No.: US 8,768,894 B2
(45) Date of Patent: Jul. 1, 2014

(54) INFORMATION MANAGEMENT INVENTORY

(75) Inventors: Eric B. Stanley, Charlotte, NC (US); Richard M. Wilson, Charlotte, NC (US); Edward W. Campbell, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 556 days.

(21) Appl. No.: 12/413,116

(22) Filed: Mar. 27, 2009

(65) Prior Publication Data

US 2010/0145921 A1    Jun. 10, 2010

Related U.S. Application Data

(60) Provisional application No. 61/120,621, filed on Dec. 8, 2008, provisional application No. 61/120,685, filed on Dec. 8, 2008, provisional application No. 61/121,046, filed on Dec. 9, 2008.

(51) Int. Cl.
*G06F 17/30* (2006.01)

(52) U.S. Cl.
USPC .......................................... 707/688; 709/202

(58) Field of Classification Search
CPC ...................................................... G06F 17/30
USPC ............ 707/10, 688, 706, E17.001, E17.005, 707/E17.032, E17.044; 709/202
See application file for complete search history.

(56) References Cited

U.S. PATENT DOCUMENTS

| | | | |
|---|---|---|---|
| 132,462 A * | 10/1872 | Szabo | |
| 6,240,416 B1 * | 5/2001 | Immon et al. | 1/1 |
| 6,516,337 B1 | 2/2003 | Tripp et al. | |
| 7,107,272 B1 * | 9/2006 | Milligan et al. | 1/1 |
| 7,865,394 B1 * | 1/2011 | Calloway et al. | 705/14.4 |
| 2002/0107958 A1 * | 8/2002 | Faraldo, II | 709/224 |
| 2009/0132462 A1 * | 5/2009 | Szabo | 707/1 |

FOREIGN PATENT DOCUMENTS

| | | | | |
|---|---|---|---|---|
| EP | 1 244 031 A1 * | 3/2001 | | |
| EP | 1 244 031 A1 | 9/2002 | | |
| EP | 1244031 A1 * | 9/2002 | ............. | G06F 17/30 |
| WO | WO 98/32289 | 7/1998 | | |

OTHER PUBLICATIONS

Mark Chaffin, Brian Knight; White paper Titled "SQL Server 2005 Metadata" Micrsoft Corp. 2006.*

(Continued)

*Primary Examiner* — Ajay Bhatia
*Assistant Examiner* — Randall Burns
(74) *Attorney, Agent, or Firm* — Michael A. Springs; Moore and Van Allen, PLLC; Patrick B. Horne

(57) ABSTRACT

An information management inventory in which information is managed electronically in a network of distributed servers including a structured data environment. Agent software may be loaded on a first server, which may be a local server, and the first server may be scanned with the agent software to identify data stores located on the first server. The information related to a first data store may be compiled with the agent software, and the information may be provided to a second server, which may be a data accumulation server. The information may be metadata about the first data store, and histories of changes to the data stores may be tracked in the second data store. Apparatus, computer readable medium systems, and computer program products are also provided.

13 Claims, 5 Drawing Sheets

(56) References Cited

OTHER PUBLICATIONS

MS SQL Server 2005, Repoting Module. Link: http://msdn.microsoft.com/en-US/library/ms159106(v=SQL.90).aspx
Microsoft SQL Server 2005 Reporting Services (SSRS) delivers enterprise, Web-enabled reporting functionality so you can create reports that draw content from a variety of data sources, publish reports in various formats, and centrally manage.*
GB Search Report dated Mar. 18, 2010 for GB Application No. GB0920479.3.
United Kingdom Examination Report dated Feb. 15, 2013 for Application No. GB0920479.3.

* cited by examiner

INFORMATION MANAGEMENT INVENTORY
ADMINISTRATIVE UNIT DATA STORE DETAIL REPORT FOR: GROUP 1

SUMMARY:

| ADMINISTRATIVE UNIT: | GROUP 1 |
| --- | --- |
| ADMIN UNIT MANAGER: | MANAGER 1 |
| TECHNICAL CONTACT: | CONTACT 1 |
| TOTAL # SERVERS: | XXXX |
| TOTAL # DATASTORES: | XXXX |
| AS OF: | APRIL 15, 2009 |

DATA STORE DETAILS:

| DATA STORE ID | ADMIN UNIT | SERVER | DATA CENTER | DATA STORE | | | OBJECT SUMMARY | | | |
| --- | --- | --- | --- | --- | --- | --- | --- | --- | --- | --- |
| | | | | PLATFORM | INSTANCE | TECH DATA STORE NAME | TABLES | VIEWS | LAST VIEWED | LAST CHANGED |
| 3636 | GROUP1 | SERVER 1 | NY1 | PLATFORM 1 | INSTANCE 1 | DATA STORE 1 | 1 | 0 | 04/01/09 | 04/01/09 |
| 3627 | GROUP1 | SERVER 1 | NY1 | PLATFORM 1 | INSTANCE 2 | DATA STORE 2 | 6 | 0 | 04/10/09 | 04/02/09 |
| 3628 | GROUP1 | SERVER 1 | NY1 | PLATFORM 1 | INSTANCE 2 | DATA STORE 3 | 8 | 0 | 04/06/09 | 04/06/09 |
| 3629 | GROUP1 | SERVER 1 | NY1 | PLATFORM 1 | INSTANCE 2 | DATA STORE 4 | 0 | 0 | 04/06/09 | 03/30/09 |
| 3630 | GROUP1 | SERVER 2 | NY1 | PLATFORM 1 | INSTANCE 2 | DATA STORE 5 | 470 | 186 | 04/06/09 | 04/06/09 |
| 3631 | GROUP1 | SERVER 2 | NY1 | PLATFORM 1 | INSTANCE 2 | DATA STORE 6 | 10 | 4 | 04/06/09 | 04/06/09 |

FIG. 5

INFORMATION MANAGEMENT INVENTORY

RELATED APPLICATIONS

This application claims the benefit of U.S. Patent Application No. 61/120,621, entitled "System and Method for Maintaining an Updated Information Inventory," filed Dec. 8, 2008, U.S. Patent Application No. 61/120,685, entitled "Data Environment Change Notification," filed Dec. 8, 2008, and U.S. Patent Application No. 61/121,046, entitled "Data Provisioning Registry," filed on Dec. 9, 2008, all sharing one or more common inventors herewith, and the entire contents of all of which are incorporated herein by reference.

BACKGROUND

In some entities, particularly large organizations, the task of storing information in data stores is often divided between divisions or by geographic location. As a result, the management of stored data may be handled at the divisional level or by geographic location. Particularly in larger organizations it may be challenging to effectively manage the storage and maintenance of information. Further, with increasing regulation regarding computerized records, organizations are being held to a higher standard in the area of effective management of their data stores.

Control over large amounts of information stored across a number of servers owned or controlled by an organization is often a necessity. There are systems available that enable the identification of information regarding a particular data store. These systems utilize open data base connectors ("ODBC") to store or otherwise provide information regarding the particular data store. However, the present ODBCs require knowledge of the existence and location of a particular data store. In addition, the ODBC will only be effective if it has security access to all of the individual data stores under management.

Moreover, many organizations, especially larger ones, have structured data stored on a number of different technical platforms, such as mid-range, main frame, and the like. As such, it is challenging for the organization to effectively manage such stored data because of a lack of knowledge about the structure and location of all data stores. This lack of knowledge may lead to operational inefficiency in the allocation and reclamation of data storage across data centers, and operational risk caused by failure to understand all data stores relevant to disaster recovery and business continuity planning.

In some industries, effective management of an organization's data stores may result in specific additional increased economic opportunities. For example, in the banking industry, banks may be permitted to use particular internal proprietary methods for calculating capital reserves if the bank can effectively demonstrate to the appropriate regulatory or governmental body that it is able to comply with strict regulations. Such regulations relate in part to the management of data resources. Inability to demonstrate competency with respect to the knowledge and control of the source of data used in such regulatory calculations can be financially disadvantageous.

SUMMARY

In accordance with one embodiment, a method of managing information electronically in a network of distributed servers including a structured data environment is provided. The method includes loading agent software on a first server and scanning the first server with the agent software to identify data stores located on the first server. The information related to a first data store is compiled with the agent software, and the information is provided to a second server.

In accordance with another embodiment, an apparatus for managing information electronically in a network of distributed servers including a structured data environment is provided. The apparatus includes means for loading agent software on a first server and means for scanning the first server with the agent software to identify data stores located on the first server. The apparatus further includes means for compiling information related to a first data store with the agent software and means for providing the information to a second server.

In accordance with another embodiment, a computer readable storage medium encoded with a data structure for managing information electronically in a network of distributed servers including a structured data environment is provided. The data structure includes a first data store located on a first server and in which object data resides. A second data store is located on a second server, and object data also resides in the second server. Metadata relating to the first and second data stores is stored in a third data store located on a third server. Agent software locally scans for data stores and extracts metadata about identified data stores on the first and second servers before sending the metadata to the third server.

In accordance with another embodiment, a computer program product for managing information electronically in a network of distributed servers including a structured data environment is provided. The computer program includes instructions for scanning the first server with agent software loaded on the first server to identify data stores located on the first server, instructions for compiling metadata related to a first data store with the agent software, and instructions for providing the metadata to a second server.

In accordance with another embodiment, an apparatus configured to manage information electronically in a network of distributed servers including a structured data environment is provided. The apparatus includes a computer readable storage medium including computer readable program code stored therein and a processor operatively coupled to the computer readable storage medium. The processor is configured to execute the computer readable program code to scan the first server with the agent software loaded on the first server to identify data stores located on the first server. The processor is further configured to compile information related to a first data store with the agent software and to provide the information to a second server.

In accordance with another embodiment, an apparatus configured to manage information electronically in a network of distributed servers including a structured data environment is provided. The apparatus includes a computer readable storage medium including computer readable program code stored therein and a processor operatively coupled to the computer readable storage medium. The processor is configured to execute the computer readable program code to store metadata related to a first data store located on a first server in a second data store located on a second server. The processor is further configured to store versions of the changes made to the metadata relating to the first data store in the second data store. The second data store is a common location where information relating to a plurality of data stores is stored.

In accordance with another embodiment, an apparatus for managing information is provided that includes a data accumulation server, a network, a plurality of local servers in communication with the data accumulation server via the network, and agent software loaded onto the plurality of local servers. The agent software identifies data stores on the local servers, compiles information about identified data stores, and provides the information relating to the data stores to the data accumulation server via the network.

The features, functions, and advantages can be achieved independently in various embodiments of the present invention or may be combined in yet other embodiments.

BRIEF DESCRIPTION OF THE DRAWINGS

For a more complete understanding, reference should now be had to the embodiments shown in the accompanying drawings and described below. In the drawings:

FIGS. 4 and 5 are examples of possible reporting capabilities of the system of FIG. 1.

Figure 1:
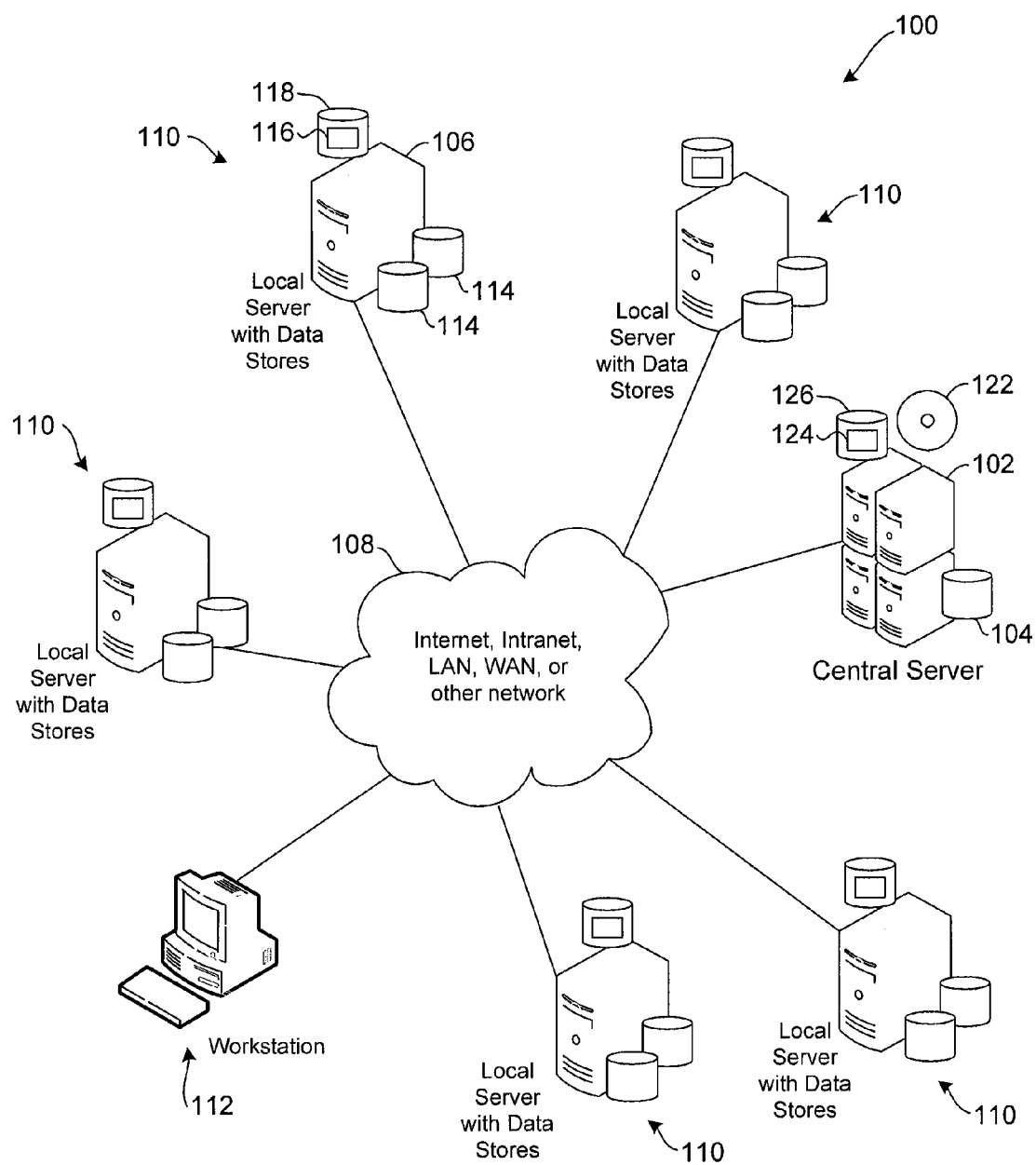
FIG. 1 is a system block diagram of one embodiment of a system for managing information in a distributed network.

The features, functions, and advantages can be achieved independently in various embodiments of the present invention or may be combined in yet other embodiments.

DETAILED DESCRIPTION

The following detailed description refers to the accompanying drawings, which illustrate specific embodiments. Other embodiments having different structures and operations do not depart from the scope of the claims appended hereto.

As will be appreciated by one of skill in the art, embodiments may take form as a method, system, or computer program product, or a combination thereof. Accordingly, the embodiments may take form by combining software and hardware aspects that may all generally be referred to herein as a "circuit," "module" or "system." Furthermore, the present invention may take the form of a computer program product on a computer-usable storage medium having computer-usable program code embodied in the medium.

Large volumes of data existing across multiple computer systems make it practical to track descriptive information about the data and data stores, rather than collecting the data itself, and such descriptive data may be referred to as metadata. Metadata is data that provides information about other data. It is used to facilitate the understanding, use and management of data by characterizing data resources and data sets to make them understandable, relevant, findable, and controlled. Metadata may describe data relevant to any feature; for example, metadata may pertain to physical asset inventory or to customer accounts. Metadata may be stored in a metadata repository, resident in a data store.

The embodiments described herein gather and store information relating to the structure and location of structured data resources within an organization, which may be categorized as technical metadata. It is envisioned that the embodiments herein are applicable in a number of different environments but may provide organization and management for systems having data resources that are geographically dispersed and/or that operate on multiple technical platforms. Technical metadata may be gathered and stored within a system through technology, which may be referred to "data store scanner software," written for each technical platform. The data store scanner software may be deployed as part of standard database administration control process. It should be noted that current products available also depend on the application of scanning technology, but do so on a point-by-point basis and do not support the scanning and reporting of resultant changes for an entire structured information environment. In order to get a description of a data resource with existing tools, in general the user of the tool needs to first know that the database exists and set up permissions with that instance, and then point the tool at that database and activate the tool's scanning capabilities.

A data store is a container in which digital information is gathered and/or maintained, including, for example, databases, although a data store is not necessarily a database. Generally, a data store may be understood to be a facility for storing data in a computer readable storage medium. The information in a data store may be structured or unstructured; embodiments described herein contemplate the management of an inventory describing structured data resources. However, a data store is not necessarily a Relational Database Management System (RDBMS), one of the most common forms of structured data management. Embodiments described herein may support an inventory that includes other types of data stores such as structured file systems or hierarchical databases.

Referring now in more detail to the drawings in which like numbers indicate like parts throughout the several views, FIG. 1 shows a representative structured information environment 100 including a distributed network. The environment 100 includes a data accumulation server 102 which may be any server that contains a data store, referred to as a central data store 104, acting as the common repository for technical metadata, with the technical metadata describing an inventory of data stores across the environment 100. The data accumulation server 102 is in communication with one or more local servers 106 via a network 108; five sets 110 of local servers with data stores are shown. The servers may be accessible through a workstation 112. The network 108 may include the Internet, an internal secured network within an organization such as an Intranet, a wide area network (WAN), a local area network (LAN), or the like. Firewalls, not shown, may be in place between the Internet and the servers 102, 106 and workstation 112. Such a structured information environment 100 may include local servers 106 that are geographically dispersed and that operate on different platforms from each other (including but not limited to various mid-range, main-frame, or structured file data store systems supported by different vendors). The local servers 106 may have data storage devices with local data stores 114 contained therein.

Agent software 116, computer program instructions that are another way to refer to data store scanner software, is stored in data storage devices 118 associated with each of the local servers 106, and may be originally loaded from the data accumulation server 102 or locally at the local server 106 off of an optical disc 122 or other computer readable storage media. Data store management software 124 is resident in a data store 126 on the data accumulation server 102 for organization, manipulation, and maintenance of the central data store 104. Interface and control may occur from the workstation 110 that may include a personal computer terminal. Each of the servers 102, 106 and the workstation 110 include one or more processors.

A computer program which implements all or parts of the invention through the use of systems like those illustrated in FIG. 1 can take the form of a computer program product, including executable code, residing on a computer usable or computer readable storage medium. Such a computer program can be an entire application to perform all of the tasks necessary to carry out the invention, or it can be a macro or plug-in which works with an existing general purpose application such as a spreadsheet or database program. A tangible medium may be used, but note, however, that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Such a medium may be, for example, but is not limited to, an electronic, magnetic, optical, electromagnetic, or semiconductor system, apparatus, device, or network.

The software and hardware components of embodiments described herein can be implemented using a variety of combinations of system elements commonly used for software engineering and systems development. The main components of significance include the choice of a Database Management System (and an associated query language) housing the metadata data store, network protocols and connectivity for integration with other systems, and an underlying operating system and hardware platform for the system as a whole.

Typically, choices of these elements are guided by cost, connectivity, and scalability considerations as well as technical standards adopted by the development group or company in question. A set of complementary choices should be made to meet the technical requirements of the target environment. For example, some implementers may focus on minimal cost, and result in a platform based on inexpensive commodity-based processors, a common operating system, a development environment, and Open Source software solutions for software development tools, database management systems and the like. Other implementers may opt to build any or all of the software components based on commercial software products provided by a common software provider as a way to achieve standards compliance or out-of-the-box interoperability. Large scale, high availability or high performance solutions may require more specialized components, matched to support more stringent business and system requirements. For large scale systems, it will also be appropriate to consider the implementation of an ETL (Extract, Transform and Load) tool for loading data transmitted from the distributed scanning agents out of a common data staging area into the metadata repository.

Figure 2:
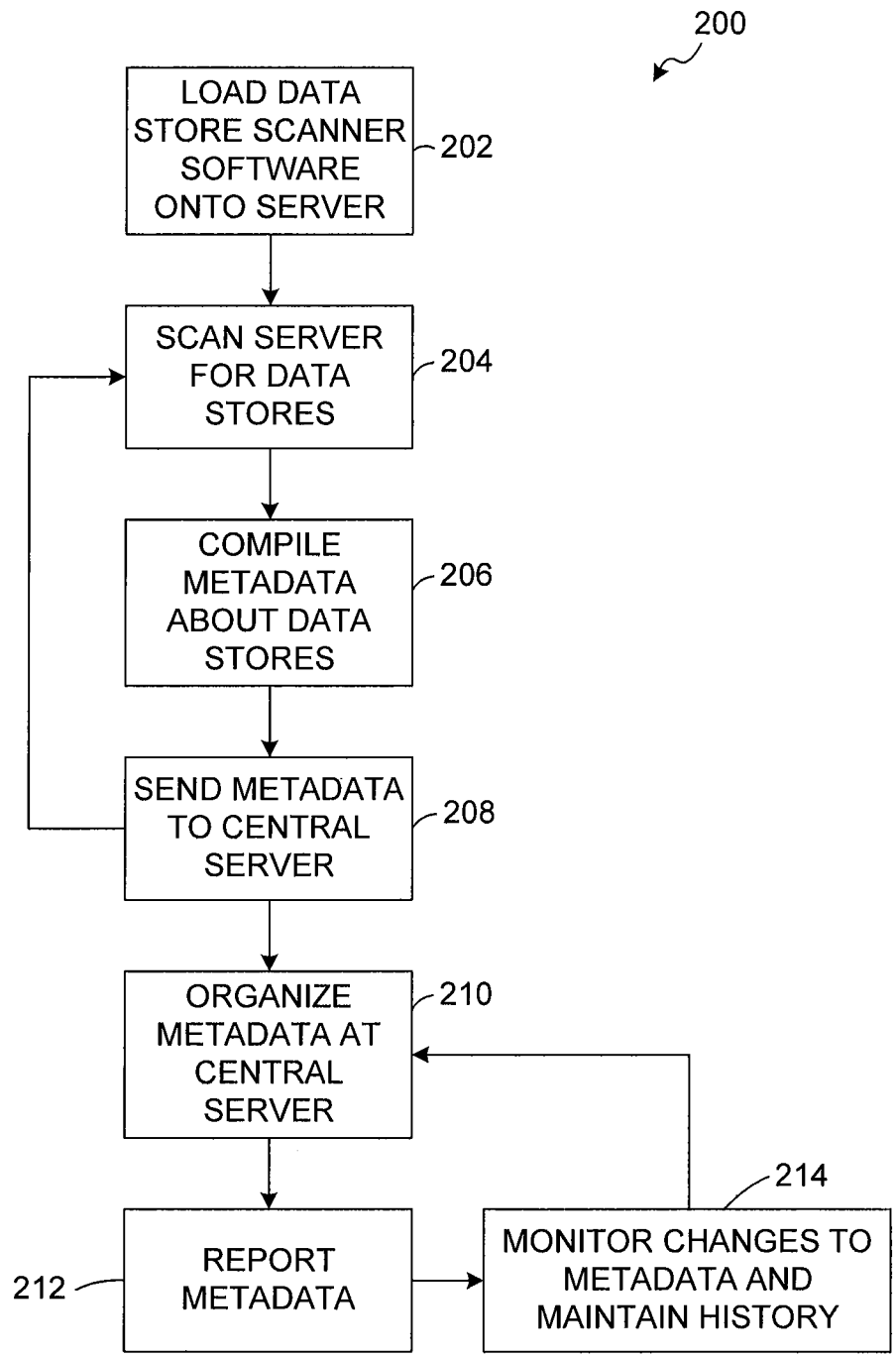
FIG. 2 is a flowchart illustrating one embodiment of an implementation of the system of FIG. 1.

FIG. 2 is a flowchart representing an embodiment of a method for managing information 200. In block 202, the agent software is loaded onto a computer, which may be a local server 106. Typically in a complex system environment, this would likely be accomplished by using packaged applications for resource management and software distribution with appropriate security rights. This step may, however, be performed on a manual basis in a smaller environment, or when technical limitations of the application(s) for resource management and software distribution require it.

Once loaded, the data store scanner software is instructed to periodically gather information relating to the configuration of data resources resident on that server represented by block 204. Such information may be collected, organized, and reported as specified by the user via the personal computer station 110. Since data stores supported by multiple vendors may be present on a particular server, the data store scanner software is configured to recognize and analyze such diverse data stores as appropriate to the technical hardware platform on which it is deployed. The data store scanner software may be authorized with read-only permissions to gather data from the system catalogs, copy books, or configuration files of data stores on that server, which data includes the technical metadata that will be transmitted to the central data store 104. Such metadata regarding the data stores is compiled on the local server 106, as represented by block 206. The metadata may include information such as the identity of the data store, the size of the data store, the computerized format of the data store, and the status of the data store (i.e. when was the last time the data store or its content was updated).

Once an initial compilation of all relevant metadata regarding each data store is accomplished, it is not necessary in most cases to repeat this operation in its entirety. To reduce the volume of data produced and transmitted by this operation, as well as to support the efficient management of history in the central data store 104, the compiling process 206 may examine only the objects in each data store that have changed since the last execution of the process and report on these objects.

Further description of the management of history in support of providing change notification with respect to the data environment, and further information related to an information management inventory is documented in commonly assigned U.S. patent application Ser. No. 12/413,122, entitled "Data Environment Change Notification," filed on concurrent date herewith, and U.S. patent application Ser. No. 12/413,125, entitled "Data Provisioning Registry" filed on concurrent date herewith, the entire contents of all of which are incorporated herein by reference.

Block 208 represents the sending of the data store information to a preselected location as instructed by the data store scanner software. This destination may be local or remote, such as a computer located on a remote server but within an organization's secure internal network, or across the Internet. Such a computer may be a data accumulation server 102 or other dedicated server for receiving such metadata. The method of transmission may vary depending on the technical options available on the host environment(s). Rudimentary methods of transfer may include, for example, direct file transfers using protocols such as FTP (File Transfer Protocol). Other options include the adoption of inter-server data transfer via IP (Internet Protocol) or the like. Periodically, or continuously as practically feasible, scanning may repeat to identify changes to the data stores, as shown by the arrow from block 208 to block 204.

Block 210 provides for the organization of the information scanned and compiled relating to the data stores, once gathered in a common repository. The data store scanner software enables the information to be organized in a number of different ways to allow the user to effectively manage each data store and the environment as a whole. The user may preselect parameters that apply to the organization of the information. One factor in the organization of metadata is the determination of how the history of the environment, once scanned, is maintained, in terms of its depth (how long) and level of detail. In addition, the process involved in block 210 includes the ability to correlate and enhance the technical metadata obtained by automated scanning processes with additional data related to the data stores that is obtained separately on a manual, automated, or semi-automated basis. Significant examples of such organization include (a) the addition of data describing the movement of data between known data stores contained in the repository (also known as data interfaces or lineage), (b) the linkage of data store elements such as tables or fields with elements of a common business language that describes their meaning in consistent terminology across the environment, (c) the addition of operational metadata which includes but is not limited to events such as job execution related to the data stores that affect the environment, (d) the correlation of data stores with information regarding the physical servers on which they reside to help manage the physical configuration of the operating environment, and (e) the linkage of data stores to technical administrative units of the organization that are responsible for the data store's development and support. Block 212 represents the reporting of such information to the user upon the request of the user. The way in which information may be reported may be preselected by the user to enable the user to effectively manage an individual data store, or more commonly a group of related data stores or the overall data environment.

The information collected by the data store scanner software is then provided to the user. The user may choose to select to receive the information in any number of formats. Further, the user may configure the information into a variety of ways to create any number of reports to provide necessary personnel with the status of the data store or data stores in question. Reports may be generated to provide the requested information in a preselected format and scope.

Block 214 represents the process of continuing to monitor any changes made to any of the identified data stores as well as to compile a history of all such changes. The monitoring of changes in block 214 is based on the periodic gathering of information (daily or otherwise) about the configuration of data resources on the server where the data store scanners reside. This enables the system to obtain an updated status of the data store that has been identified and a history of such changes made over time. Any new information added to the data store will be detected by the application, compiled, sent, organized, and reported to the user as requested.

It should be noted that the continuous management of metadata, and in particular the gathering and updating of information on the data stores as shown in block 214, may result in a significant amount of data relating to the history, changes, and trends of the information environment. This information, especially trends, can be organized and reported by a user to the organization's management for educational and decision making purposes. An organization may manage an entire structured data environment, as well as manage versioning of the system-wide metadata. As a result, the system and methods herein described may serve as the data source for an organization-wide metrics in support of an organizational data governance program.

Figure 3A:
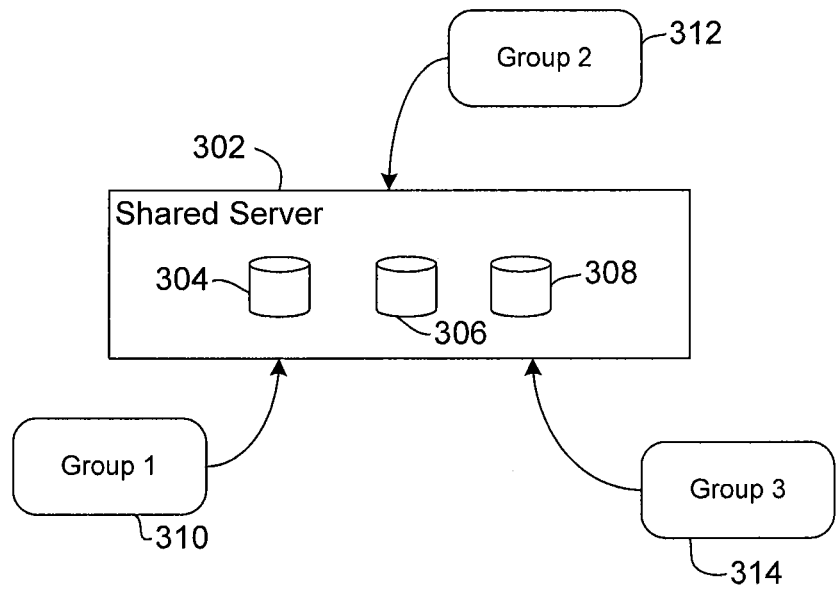
FIGS. 3A and 3B are schematic diagrams illustrating a possible effect of implementing the system of FIG. 1.
Figure 3B:
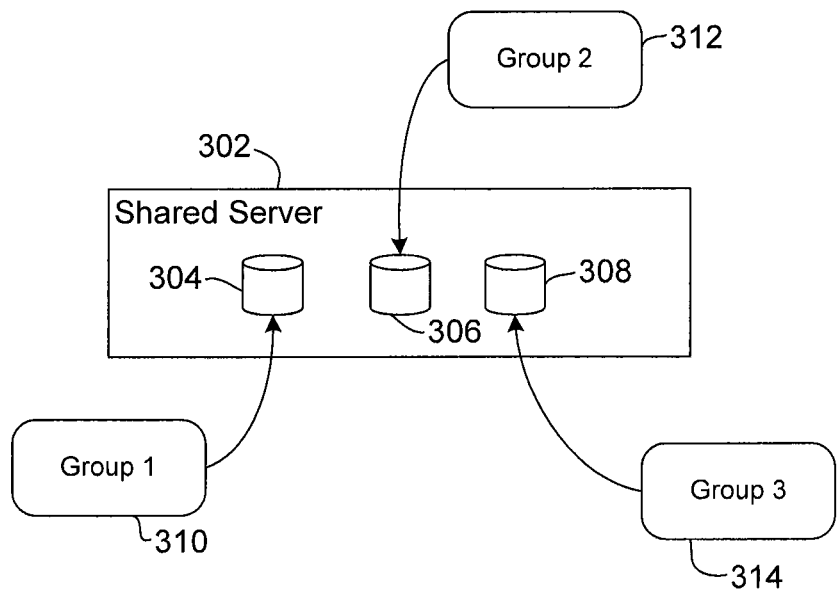

FIGS. 3A and 3B show a possible effect of implementing embodiments described herein. A shared server 302 electronically stores some of an organization's data stores 304, 306, 308. Several administrative units or groups 310, 312, 314 within an organization may locate data stores on the shared server 302, and it is known within the organization that the three groups 310, 312, 314 share the server 302. However, it is not known to the organization what data stores are located on the shared server 302 and to what groups any such data resources might belong. It may be challenging to sort out ownership, either whole or partial, of any number of data stores on a particular server, and consequently to assign internal accountability for that data store.

In FIG. 3A, at present the organization knows that groups 310, 312, 314 pay for the operation of shared server 302, but this may be the extent of the knowledge of the organization. Using one embodiment described herein, for example, that shown in FIG. 2, data stores 310, 312, 314 can be identified within the shared server 302, as shown in FIG. 3B. Ownership (both whole and partial) and associated hardware costs may be determined through the process of correlating the technical metadata about the location of the data stores, which may be obtained by scanning agents with an understanding of the organizational hierarchy.

Figure 4:
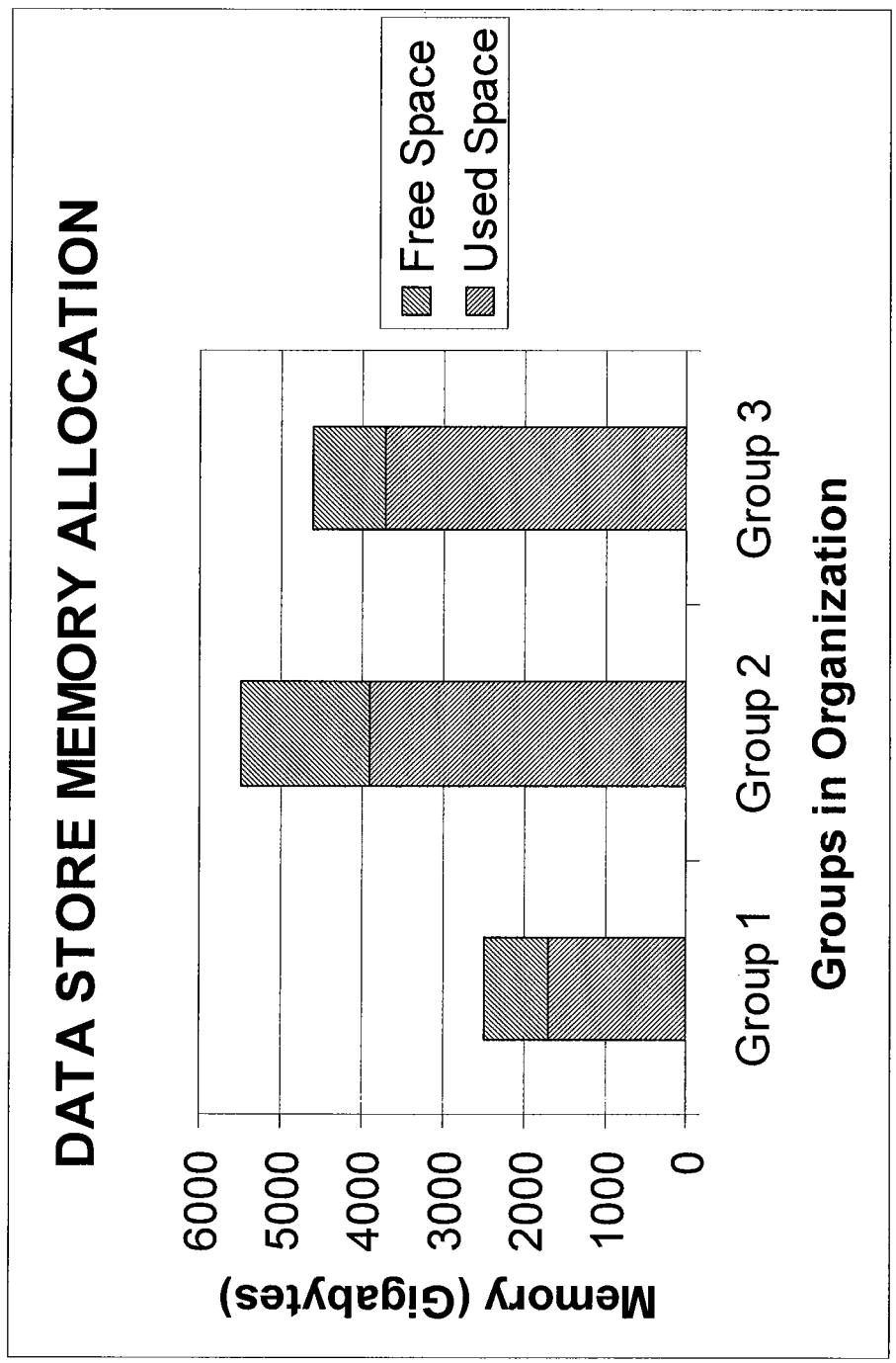

Information that may be available and reported by an embodiment described herein is shown in FIG. 4 in bar chart form. Analysis of cumulative allocated data store memory includes "used space" and "free space" available in data stores and identified by administrative units within the organization, such as Group 1, Group 2, and Group 3. Tracking of historical data for usage of data store memory may allow derivation of space trending reports by group.

FIG. 5 shows an example of one report that may be a work product of the embodiments described herein. The Administrative Unit Data Store Report for Group 1 includes a Summary and Data Store Details. The Summary identifies the Administrative Unit or applicable group within the organization to be Group 1, and the responsible manager and technical contact. The total number of servers and data stores is provided as of a certain date. In the Data Store Details is a data store ID, the administrative unit, the server on which the applicable data store resides, and the data center, which may often be associated with a geographic location. Information on the data stores includes the operating platform, which in this case is a common operating platform, the instance, which describes a specific technical installation and can hold multiple data stores, and the technical data store name. An object summary includes a count of tables and views in the data stores. Views are virtual selections of data from a database, and may look like tables, but are a compendium of information from one or more tables. The dates the each data store was last viewed and last changed are provided. It is understood that this report is abbreviated and could include more information, and that other information may be available in different reports or through access and direction of the data store scanning software on local servers and the data store management software on a data accumulation server.

The flowcharts and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are intended in no way to limit the scope of the appended claims to the specific embodiments described herein.

What is claimed is:

1. A method of managing information electronically in a network of distributed servers including a structured data environment, the method comprising:

choosing and implementing complementary components including a Database Management System (DBMS) and associated query language, the DBMS configured for housing a metadata data store, network protocols and connectivity for integration with disparate systems, and an operating system and hardware platform at least for the metadata data store, wherein the choices are made based at least in part on cost, connectivity, scalability and technical standards of a target environment;

loading agent software on a central data accumulation server and at least two local servers wherein at least two of the at least two local servers are geographically dispersed from one another and at least two of the at least two local servers operate on different platforms from one another;

scanning at least one of a system catalog, copy book or configuration file of the local servers with the agent software to identify technical metadata related to one or more data stores located on the local servers;

compiling first information as specified by a user, the first information related to a first data store identified on a first local server with the agent software and related to a second data store identified on a second local server with the agent software, wherein the first information related to the first data store comprises an identity of the first data store, a size of the first data store, a computerized format of the first data store, and a status of the first data store, and wherein the first information related to the second data store comprises an identity of the second data store, a size of the second data store, a computerized format of the second data store, and a status of the second data store;

storing the first information related to the first data store in the second data store;

receiving the compiled first information on the central data accumulation server;

processing the compiled first information on the central data accumulation server comprising generating one or more reports regarding the compiled first information on the central data accumulation server upon request of a user, wherein the scope of the reports regarding the compiled first information is preselected by the user;

periodically scanning the local servers with the agent software to identify at least one data store that has changed since a previous scanning event;

compiling second information as specified by a user related to at least one change to the at least one data store;

receiving the compiled second information on the central data accumulation server; and processing the compiled second information on the central data accumulation server related to the at least one change to the at least one data store, the processing comprising generating one or more reports regarding the compiled second information related to the at least one change to the at least one data store upon request of a user, wherein the scope of the reports regarding the compiled second information is preselected by the user.

2. The method of claim 1, wherein the method further comprises performing metadata management services on the data accumulation server.

3. The method of claim 2, wherein the first information relating to the first data store comprises metadata comprising data store information comprising one or more data store characteristics comprising one or more of a data type, a status, a nature, a creator or an ownership.

4. The method of claim 2, further comprising storing versions of the changes made to the information relating to the first data store on the first local server in the first data store.

5. The method of claim 4, wherein the information relating to the first data store on the first local server and the changes relating to the first data store are metadata.

6. The method of claim 5, further comprising maintaining a history of the changes relating to the first data store on the first local server with data management software.

7. The method of claim 6, further comprising organizing the information and changes relating to the first data store on the first local server with the data management software.

8. The method of claim 7, further comprising reporting on the information and changes relating to the first data store on the first local server with the data management software.

9. A method for managing information electronically on a first local server and a second local server, in a network of distributed servers including a structured data environment, the method comprising:

choosing and implementing complementary components including a Database Management System (DBMS) and associated query language, the DBMS configured for housing a metadata data store, network protocols and connectivity for integration with disparate systems, and an operating system and hardware platform at least for the metadata data store, wherein the choices are made based at least in part on cost, connectivity, scalability and technical standards of a target environment;

reading, using a processor, a storage medium having a computer program stored therein, the computer program comprising instructions for:

scanning at least one of a system catalog, copy book or configuration file of the first local server and the second local server with agent software loaded on the first local server and the second local server to identify technical metadata related to one or more data stores located on the first local server and the second local server, the first local server and the second local server being geographically dispersed from one another and operating on different platforms from one another;

compiling first information as specified by a user, the first information related to a first data store identified on the first local server with the agent software and related to a second data store identified on the second local server, wherein the first information related to the first data store comprises an identity of the first data store, a size of the first data store, a computerized format of the first data store, and a status of the first data store, and wherein the first information related to the second data store comprises an identity of the second data store, a size of the second data store, a computerized format of the second data store, and a status of the second data store;

storing the first information related to the first data store in the second data store;

providing the first information to a central data accumulation server so that the compiled first information is processed by generating one or more reports upon request of a user, wherein the scope of the reports regarding the compiled first information is preselected by the user;

periodically scanning the first local server and the second local sever with the agent software to identify at least one data store that has changed since a previous scanning event;

compiling second information as specified by a user related to at least one change to the at least one data store; and providing the second compiled information to the central data accumulation server so that the compiled information is processed by generating one or more reports regarding the compiled second information related to the at least one change to the at least one data store upon request of a user, wherein the scope of the reports regarding the compiled information is preselected by the user.

10. A non-transitory computer-readable storage medium including computer readable program code stored therein, the computer readable program code configured to cause a processor operatively coupled to the computer-readable storage medium to:

scan at least one of a system catalog, copy book or configuration file of a first local server and a second local server with agent software loaded on the first local server and the second local server to identify technical metadata related to one or more data stores located on the first local server and the second local server, the first local server and the second local server being geographically dispersed from one another and operating on different platforms from one another;

compile first information as specified by a user, the first information related to a first data store identified on the first local server with the agent software and related to a second data store identified on the second local server, wherein the first information related to the first data store comprises an identity of the first data store, a size of the first data store, a computerized format of the first data store, and a status of the first data store, and wherein the first information related to the second data store comprises an identity of the second data store, a size of the second data store, a computerized format of the second data store, and a status of the second data store;

store the first information related to the first data store in the second data store;

provide the first information to a central data accumulation server so that the compiled first information is processed by generating one or more reports upon request of a user, wherein the scope of the reports regarding the compiled first information is preselected by the user;

periodically scan the first local server and the second local server with the agent software to identify at least one data store that has changed since a previous scanning event;

compile second information as specified by a user related to at least one change to the at least one data store; and provide the compiled second information to the central data accumulation server so that the compiled second information is processed by generating one or more reports regarding the compiled second information related to the at least one change to the at least one data store upon request of a user, wherein the scope of the reports regarding the compiled second information is preselected by the user.

11. A system for managing information comprising:

a Database Management System (DBMS) having an associated query language, the DBMS configured for housing a metadata data store, network protocols and connectivity for integration with disparate systems, and an operating system and hardware platform at least for the metadata data store, wherein the DBMS is selected based at least in part on cost, connectivity, scalability and technical standards of a target environment;

a first local server and a second local server; the first local server and the second local server running a first agent software; the first local server and the second local server being geographically dispersed from one another and operating on different platforms from one another; and a data accumulation server configured for communicating with the first local server and the second local server, the data accumulation server comprising a processor configured for executing a second agent software, the processor configured for:

receiving first information compiled by the first agent software, wherein the first information is compiled as specified by a user and based on the first agent software scanning at least one of a system catalog, copy book or configuration file of the first local server and the second local server to identify technical metadata related to one or more data stores located on the first local server and the second local server, wherein the first information is related to a first data store identified on the first local server, the first information related to the first data store comprising an identity of the first data store, a size of the first data store, a computerized format of the first data store, and a status of the first data store, wherein the first information is further related to a second data store identified on the second local server, the first information related to the second data store comprising an identity of the second data store, a size of the second data store, a computerized format of the second data store, and a status of the second data store;

storing the first information related to the first data store in the second data store;

processing the compiled first information on the data accumulation server to generate one or more data store reports upon request of a user, wherein the scope of the reports regarding the compiled first information is preselected by the user receiving second information compiled by the first agent software, wherein the second information is compiled as specified by a user and based on the first agent software periodically scanning the first local server and the second local server to identify at least one data store that has changed since a previous scanning event; and processing the compiled second information related to the at least one change to the at least one data store to generate one or more data store reports upon request of a user, wherein the scope of the reports is individually configured by one or more users.

12. The system of claim 11, wherein the processor is further configured to maintain a history of the changes relating to one or more of the identified data stores in the first local server and the second local server with data management software.

13. The system of claim 12, wherein the processor is further configured to organize the information and changes relating to the one or more identified data stores in the first local server and the second local server with the data management software.

* * * * *